R. B. WILLIAMSON.
SYSTEM OF DISTRIBUTION.
APPLICATION FILED SEPT. 30, 1909.

1,138,341.

Patented May 4, 1915.

Witnesses
John L. Johnson
Chas. L. Byron

Inventor
Robert B. Williamson
By Chas. E. Lord
Attorney

UNITED STATES PATENT OFFICE.

ROBERT B. WILLIAMSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SYSTEM OF DISTRIBUTION.

1,138,341.      Specification of Letters Patent.      Patented May 4, 1915.

Application filed September 30, 1909. Serial No. 520,330.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Systems of Distribution, of which the following is a full, clear, and exact specification.

My invention relates to systems of electrical distribution.

In many electrical systems, there are wide load fluctuations which occur with considerable rapidity. If these fluctuations in their entirety fall upon the generator or generators, the latter must generally be of sufficient capacity to carry the greatest load. Since this greatest load is often several times as large as the average load, the generator or generators supplying the system, together with their driving apparatus, must be considerably larger than is economical for that average load. Moreover, the sudden fluctuations in the demand on the generators and their driving apparatus tend to produce various troubles in operation.

It is the object of my present invention to provide a system in which the load on the generator or generators supplying the system may be maintained substantially constant regardless of fluctuations in the load on the system. This allows the capacity of the generator or generators and their driving apparatus to be very much reduced;—reduced, indeed, so that it is necessary only that their capacity exceed very slightly that necessary for the average load.

In carrying out my invention, a freely running dynamo-electric machine on whose shaft is a fly wheel is connected across the circuit on which is the fluctuating load, and the field of this machine is controlled by means responsive to the current supplied by the generator to the circuit.

The various novel features of my invention will appear from the description and drawings, and will be particularly pointed out in the claims.

Figure 1:
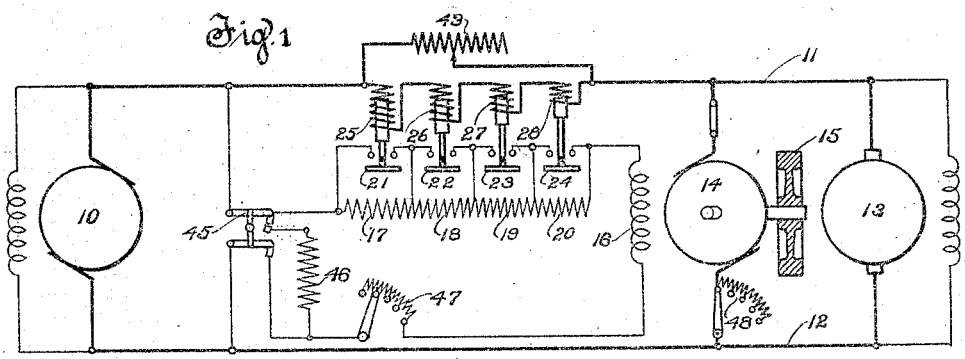
Figure 2:
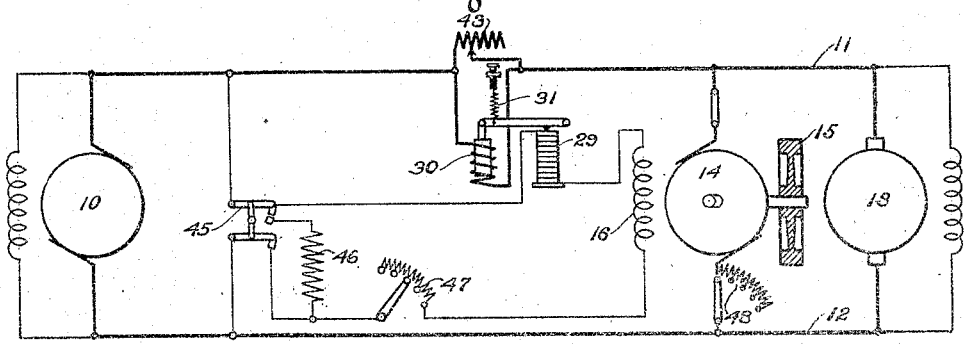
Figure 3:
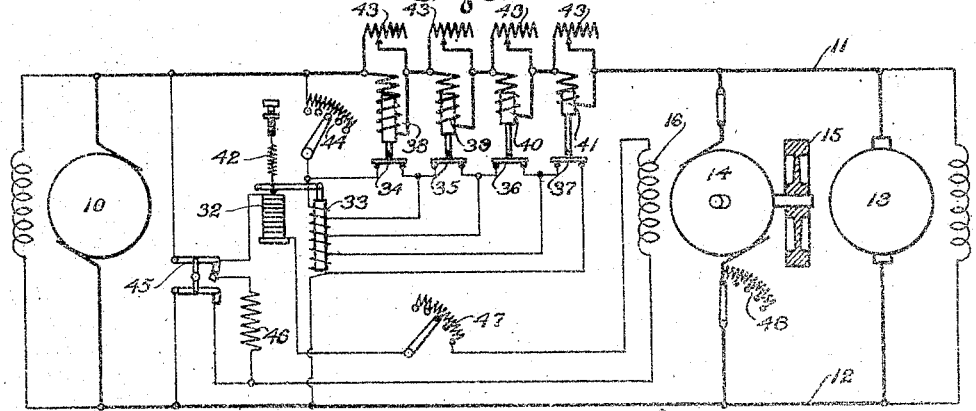

Figure 1 of the drawings shows diagrammatically a system embodying my invention, said system showing the freely running dynamo-electric machine field resistance as being controlled by separately actuated solenoid switches; Fig. 2 is a diagrammatic view disclosing a modification of my invention, wherein the compressible resistance of the freely running dynamo-electric machine field is controlled by a solenoid in the supply circuit; and, Fig. 3 is another modification of my invention wherein the compressible resistance in the freely running dynamo-electric machine field circuit is controlled by a series of solenoid-operated switches.

A generator 10 supplies a circuit 11—12, across which is a fluctuating load represented by a motor 13. This load, for instance, may be the motor or motors which are used to drive the rolls of rolling mills. The generator 10 may be excited and regulated in any desired manner, preferably to give a constant electro-motive force. The load 13 may be controlled in any desired manner in order to obtain the required results.

A dynamo-electric machine 14 has its armature connected across the circuit 11—12, and on the shaft of this machine is a flywheel 15. The field 16 of this machine may be excited in any desired manner, being here shown as connected across the circuit 11—12. The field strength of the machine 14 is so varied that the machine acts as a motor to store energy in the fly-wheel 15 when the load 13 on the circuit 11—12 is light, but acts as a generator driven by the fly wheel 15 when the load 13 on the circuit 11—12 is heavy. The control of the field of the machine 14 may be obtained in a number of ways.

In the arrangement shown in Fig. 1, a number of resistance sections 17, 18, 19, 20 are in the circuit of the field winding 16 of the machine 14. Normally open switches 21, 22, 23, 24, when closed, short-circuit the respective resistance sections 17, 18, 19, 20. These switches are respectively operated by solenoids 25, 26, 27, 28, which carry the whole or a proportional part of the current supplied by the generator 10. These solenoids are so arranged, as by having different numbers of turns or different air gaps, that they respond to different strengths of current.

When the load 13 on the circuit 11—12 is light, the dynamo-electric machine 14 runs as a motor to store energy in the fly-wheel 15. When the load 13 on the circuit 11—12 increases, the current supplied by the generator 10 also increases somewhat and the solenoid 25 closes its switch 21 to short-circuit the resistance section 17. This increases the field strength and therefore the electro-motive force of the machine 14, and causes it to take less current as a motor or to act as a generator driven by the now slackening fly-wheel 15 to supply current to the circuit 11—12 and help furnish the current necessary for the load 13. If the cutting out of the resistance section 17 is not sufficient to keep the load on the generator 10 practically at its normal predetermined value, the solenoid 26 raises its switch 22 to cut out the resistance section 18, which further increases the field strength and electro-motive force of the machine 14 and causes it to take still less current as a motor or to supply still more current as a generator. If necessary to keep the current supplied by the generator 10 at substantially its normal value, the solenoids 27 and 28 also lift their switches 23 and 24 in turn to cut out the resistance sections 19 and 20 and to increase still further the field strength of the machine 14.

When the load 13 now decreases, the solenoids 28, 27, 26, 25, or such of them as have raised their respective switches, drop such switches in turn to cut into circuit such of the resistance sections 17, 18, 19, and 20 as had been cut out of circuit. This diminishes the field strength of the machine 14 and causes it to supply less current as a generator or to take more current as a motor. The cutting in of the resistance sections 17, 18, 19, and 20, like the cutting out thereof, proceeds just fast enough to keep the current supplied by the generator 10 substantially constant. Whenever there is any excess of current supplied by the generator over that demanded by the load 13, the machine 14 takes such excess and stores up energy in the fly-wheel 15. Whenever there is any excess of current demanded by the load 13 over that supplied by the generator 10, the fly-wheel 15 gives up its stored energy and drives the machine 14 as a generator to supply such excess. This system keeps the load on the generator 10 substantially constant within very small limits, in spite of wide fluctuations in the load 13. These limits may be made as small as desired by properly proportioning and adjusting the several solenoid switches.

In the arrangement shown in Fig. 2, a carbon pile resistance 29 is in circuit with the field winding 16. A solenoid 30 carrying current supplied by the generator 10 or a current proportional thereto tends to increase the pressure on the carbon pile against the action of a spring 31. As the load 13 on the circuit 11—12 increases, a small part of the increase of current flows through the solenoid 30 and causes it to diminish the resistance of the carbon pile 29 to raise the electro-motive force of the machine 14 so that the difference in the current in the armature makes the greater part of the increase in current demanded by the load 13. As the load 13 decreases, the solenoid 30 diminishes its pressure on the carbon pile 29, and the resultant change in the strength of the field 16 causes the machine 14 to act less as a generator or more as a motor to maintain the load on the generator 10 substantially constant.

In the arrangement shown in Fig. 3, a carbon pile resistance 32 is in circuit with the field winding 16. This carbon pile resistance is controlled by the sectional solenoid 33, sections of which are normally short-circuited by switches 34, 35, 36, and 37. These switches can be opened by solenoids 38, 39, 40, and 41, which carry the current supplied by the generator 10 or a current proportional thereto. As the load 13 on the circuit 11—12 increases, there is a very small rise in the current supplied by the generator 10. According to the extent of this rise, some or all of the solenoids 38, 39, 40, and 41 raise their associated switches 34, 35, 36, 37 to cut into circuit sections of the solenoid 33. As each section of this solenoid is cut into circuit it increases the pull of the solenoid against the spring 42, and thus increases the pressure on the carbon pile 32, the strength of the current in the field winding 16, and the electromotive force generated by the machine 14. This causes such machine to take less current as a motor or to supply more current as a generator to maintain substantially constant the current supplied by the generator 10. As the load 13 decreases, the solenoids 41, 40, 39, and 38, or such of them as have opened their associated switches, drop their switches in turn to decrease the pull of the solenoid 33 and the electromotive force generated by the machine 14. This variation in the electromotive force of the machine 14 is so proportioned that the current supplied by the generator 10 varies but very slightly from a predetermined value, the machine 14 acting as a generator or as a motor as required to absorb the fluctuations in current.

Various adjustments of the several parts may be provided. For instance, the springs 31 and 42 may be adjustable. The proportion between the currents in the solenoids 25, 26, 27, 28, 30, 38, 39, 40, and 41 and that delivered by the generator 10 may be varied, s by rheostats 43. The strength of the solenoid 33 may be varied, as by a rheostat 44 in circuit therewith. A switch 45, with which may be associated a discharge resistance 46 for taking the field discharge of the motor 14, may be provided for the circuit of the field winding 16, and there may be a manually operated rheostat 47 in such circuit. A starting resistance 48 may be provided in the armature circuit of the machine 14.

Various modifications may be made in the precise arrangements herein shown and described, and all such which do not involve a departure from the spirit and scope of my invention I aim to cover in the following claims.

What I claim as new is:

1. In combination, a generator, a circuit supplied thereby, a dynamo-electric machine connected across said circuit, a fly-wheel on the shaft of said machine, a compressible resistance in the field circuit of said machine, and a plurality of solenoid operated switches directly responsive to different strengths of current supplied by said generator and operating to vary the pressure on said compressible resistance changing the effective resistance thereof for causing fluctuations in the load on said supplied circuit to be absorbed by said machine and fly-wheel.

2. In combination, a generator, a circuit supplied thereby, a dynamo-electric machine, means for regulating the voltage of said machine comprising a compressible resistance for the machine field circuit, a series of solenoids responsive to different strengths of current supplied by said generator, a separate solenoid the core of which is actuated to change the pressure on said compressible resistance medium, and switches operated by said series of solenoids and being adapted to vary the number of effective turns of said separate solenoid for controlling the amount of effective resistance in said field circuit.

3. In combination with an electric circuit, a resistance, means for regulating said resistance comprising a series of solenoids responsive to different strengths of current in said circuit, switches operated by said solenoids, a separate solenoid the core of which is actuated to vary said resistance, said switches when actuated by different strengths of current in said circuit acting to vary the number of effective turns of said separate solenoid for controlling the value of said resistance.

4. In combination with an electric circuit, a variable resistance, means for regulating said resistance comprising a series of electromagnetically operated switches responsive to different strengths of current in said circuit, and an electromagnet the movable part of which is actuatable to vary the value of said resistance, said switches being actuatable by different strengths of current in said circuit to vary the effective ampere turns of said electromagnet for controlling the action of said movable part.

In testimony whereof I affix my signature, in the presence of two witnesses.

ROBERT B. WILLIAMSON.

Witnesses:
G. B. SCHLEY,
CHAS. L. BYRON.